Patented Apr. 15, 1930

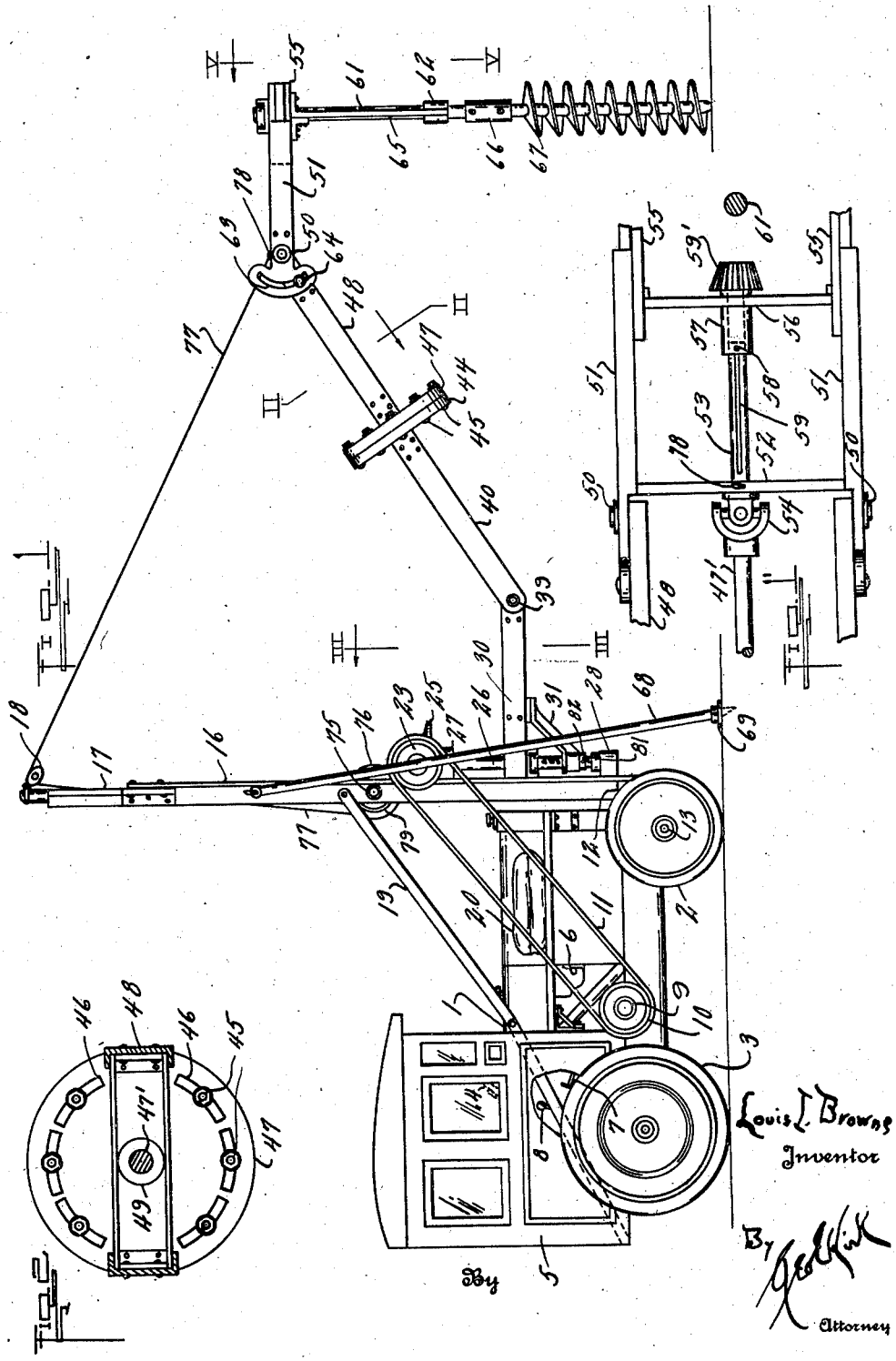

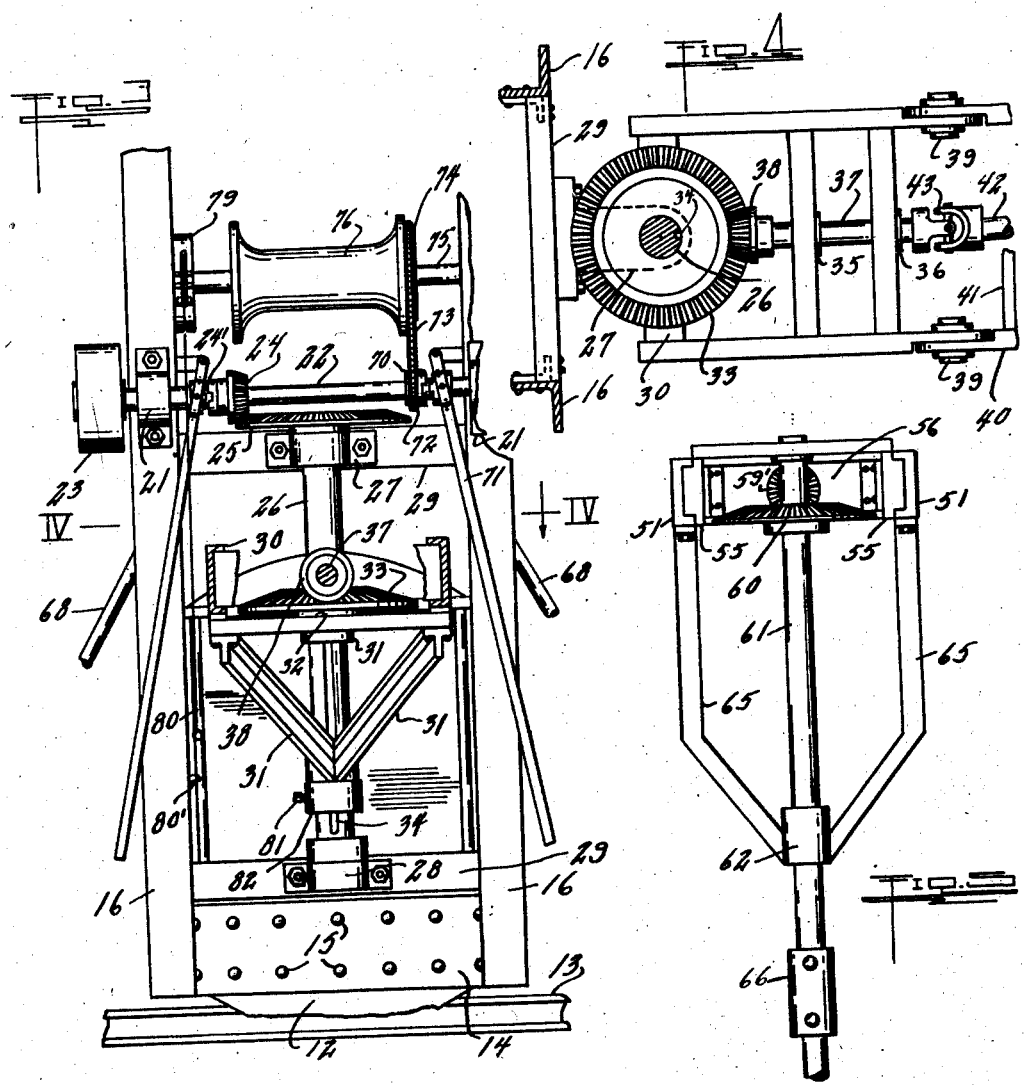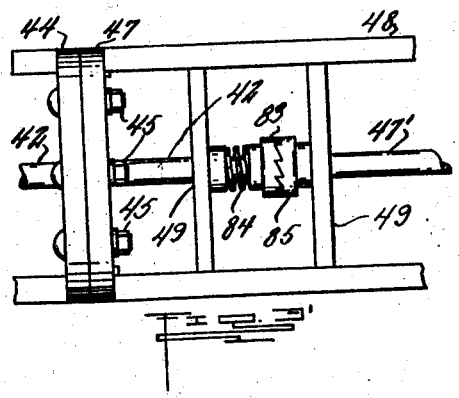

1,754,348

UNITED STATES PATENT OFFICE

LOUIS I. BROWNE, OF TOLEDO, OHIO

POWER TOOL

Application filed April 1, 1927. Serial No. 180,179.

This invention relates to power operated tools, more particularly as directed and adjusted remote from the support therefor.

This invention has utility when incorporated in diggers for pole, post, or pile holes, as for line poles, with facility for locating the tool say across a ditch or spaced from the tool support, as a tractor.

Referring to the drawings:

Fig. 1 is a side elevation, with parts broken away, of an embodiment of the invention as a line pole hole digger;

Fig. 1' is a partial plan view of the boom terminus;

Fig. 2 is a section on the line II—II, Fig. 1, looking in the direction of the arrow;

Fig. 3 is a section on the line III—III, Fig. 1, looking in the direction of the arrow;

Fig. 3' is a fragmentary view in plan of the boom;

Fig. 4 is a section on the line IV—IV, Fig. 3, looking in the direction of the arrow; and Fig. 5 is a view on the line V—V, Fig. 1, looking in the direction of the arrow.

Motor vehicle 1 is shown as mounted on directing wheels 2 and tractor propulsion wheels 3. The course of the vehicle may be directed by steering wheel 4 in cab 5. This tractor or motor vehicle 1 is shown as having internal combustion motor 6 connectible by operation of clutch pedal 7 and transmission control lever 8 for throwing into desired direction and speed of rotation drive shaft 9 carrying pulley 10 about which extends power transmission belt 11.

This motor vehicle 1 is provided with chassis or main frame 12 upon which, above and forwardly of front axle 13, is mounted plate 14 assembled therewith by bolts 15. This plate 14 as anchored with the chassis frame, has upstanding therefrom angle bars 16 as bolted to this plate 14 and resting on the chassis frame 12. This pair of angle bars, one from adjacent each side of the frame 12, are upwardly extending in parallel relation and form an upper terminus having upward extension 17 from adjacent the terminus of which there is swivelled pulley 18.

These angle bars 16 and the overhang 17 comprises a mast, which is stiffened as to the vehicle chassis by pivoted brace bars 19. In instances of operation it may be desirable to counterweight the tractor as to this mast and the tool. To this end, loading rearwardly from the front wheels 2 may occur, say by placing sand bags 20 thereon.

Near the upper portion of the uprights 16, bearings 21 are provided for shaft 22 having outwardly from the mast of these uprights 16, pulley 23. Between the uprights 16, this shaft 22 is connectable through clutch 24' with bevel pinion 24, in mesh with bevel gear 25 on vertical shaft 26 mounted in bearings 27, 28, carried by cross braces 29 stiffening the uprights 16, maintaining such spaced in the uprights 16, and carrying or mounting this vertical mast, and carrying or mounting this vertical shaft 26 just forwardly of the uprights 16 in a common plane as to its axis with the axis of the horizontal shaft 22. The driving belt 11 passes about this pulley 23, and there is thus a controlled rotation for the direction and speed of this shaft 22 as determined by the drive from the shaft 9. Likewise of the vertical shaft 26. Loosely mounted on this shaft 26 is bracket 30 having depending extension 31 providing bearing 32 for bevel gear 33 having spline connection 34 for being rotated by the shaft 26 along which it is movable with the bracket 30, 31.

This bracket 30 is provided with bearings 35, 36, (Fig. 4) mounting shaft section 37 carrying bevel pinion 38 in mesh with bevel gear 33 in approximating the line of this shaft 37 at hinge joint 39 for boom extension 40 from this bracket boom section 30, 31. This boom section 40 is provided with bearings 41 and shaft section 42 having transmission coupling 43 with the shaft section 37. This boom portion 40 carries plate or disk 44 which may be assembled by bolts 45 as passing through slots 46 for anchoring rigidly therewith companion disk 47 rigid with boom section 48. This boom section 48 is provided with bearings 49 for the shaft section 47' as passing axially through disks 44, 47.

This boom section 48 has hinge portion 50 mounting guide channels 51 of additional boom section carrying bearing 52 for shaft section 53 as having transmission connection 54 for rotation from the shaft 47' (Fig. 1').

Between these rails or channels 51 and carried thereby are members 55 as a telescopic extension boom section carrying bearing 56 for shaft section 57 provided with cross pin 58 operable in slot 59 as a spline transmission connection for driving, from this shaft section 57, bevel pinion 59' in mesh with bevel gear 60 on shaft 61 mounting bearing 62 carried by the telescopic boom extension 55. The boom extension 51 is shown as having arc slot portion 63 coacting with clamping pin 64 in the boom section 48. The shaft 61 as depending from the telescopic boom section 55 is directed by braces 65, and sleeve 66 may be connected to have power driven tool 67 herein shown as a scroll earth digger.

In operation hereunder, the one controlling the vehicle may approach the desired region for locating the hole say for a line pole. However, if such be along a highway, even a paved highway wherein the pole location may be laterally of the highway, or across a ditch, this vehicle 1 may be brought into a desired range relation even to span such ditch. In the event the mass of the boom and its mounting as to the tool carrier or the ground support for the vehicle be soft or uncertain, braces 68 with feet 69 may be located as jacks for giving supplemental stability to the mast 16, 17. The boom may be angularly directed upon shaft 26 as an axis for locating the tool 67 at the desired range from the vehicle 1. The telescopic section 55 permits some longitudinal adjustment.

The vertical height of the boom 30, 40, 51, 55, may be adjusted. To this end on shaft 22 is mounted clutch 70 having control extension 71 therefrom operable for holding this clutch 70 at its transmission connection with sprocket wheel 72 for driving, through sprocket chain 73, sprocket 74 on shaft 75 between the uprights 16 above the shaft 22. This shaft 75 carries hoist drum 76 from which extends line 77 through pulley 18 to connection 78 at the bearing 50. There is accordingly possible the power drive for adjusting the boom terminus. As such adjustment is obtained, the clutch 70 may be released. In the event there is desired a holding for such adjusted position, brake 79 may have brake control line 80 operated to throw such brake into holding position for the drum 76 by engaging catch 80'.

In the event the vehicle 1 should dispose the boom at an angle or there should be hill or other irregularity in the ground surface making it desirable to line the tool 67 up in some relation different from the mast 16, this course is readily accomplished by angularly adjusting the disk 47 as to the disk 44 and then locking for such adjusted position by the bolts 45. The position of the bracket 30, 31, may be determined for a desired range of holding depth as to its position along the shaft 26 and at such position may be anchored by set screw 81, in collar 82. The hinges 39 permit swing of the boom extension 40, 48, 51, 55, through the operation of the line 77 for locating the tool 67 at the position of work on the ground for starting.

As the tool works into the ground there is automatic compensation for maintained vertical hole digging. For this operation, the bolt 64 may be slacked off to allow the boom section 51, 55, to maintain a perpendicular relation for the shaft 61 in the working of the shaft 61 downward as the tool 67 goes into the ground. This of course means a variation of the perpendicular distance from the hinge 39 as this boom 40 also descends. There is a compensation for this as the brake 79 is slacked for feeding the tool in the telescopic section 55 as to the section 51 and the hinge 50. Accordingly, in the operations hereunder, there is a flexibility permitting location of a hole as to the vehicle in a wide range remote from the vehicle and even as to the direction of driving which might even be at an angle as much as horizontal or greater from the vertical. The location of the boom in the desired position as to the hole leaves the boom to serve only as a power transmission line carrier with the mast of the tool radially working such tool into the ground for elevating the dirt therefrom as the tool descends. In instances say at starting the work where stiffening might be desired as to the directing of the boom, supplemental directing may be given the hinge 39 with the bracket 30, with the boom section 40 at an upward angle to have the section 51, 55, elevated about half the depth of the proposed hole above the section 30.

In the operation of the tool 67 there may be instances wherein such will strike excessive resistance as by intercepting a tree root, boulder, or other hard substances embedded in the soil. Under these circumstances, there is automatic release precluding damage to the equipment. To this end driving shaft section 42 in the boom 40 has splined thereon toothed clutch member 83 normally thrown by adjustable compression spring 84 into transmission engagement with opposing toothed member 85 fast with the shaft section 47'. It accordingly follows in the instance wherein there is excessive resistance at the tool, there may be continued rotation of the shaft 42 with slippage at this safety connection 83, 85, due to the teeth of the clutch members being wedged apart under the transmission strain and against the resistance of spring 84.

What is claimed and it is desired to secure by Letters Patent is:

1. A vehicle, a mast thereon, a boom from said mast comprising a plurality of sections having adjustable range and angle cooperation therebetween, a tool carrier mounted on the boom, means for adjusting the boom by swinging in a horizontal arc as to the mast, and a power transmission from the vehicle to the carrier for rotating the carrier.

2. A vehicle, a mast thereon, a boom mounted for rigid holding in a position radially from the mast, a tool carrier mounted on the boom, means for adjusting the entire boom vertically of the mast, and power transmission from the vehicle carried by the mast and boom.

3. A vehicle, a mast rising terminally thereon, a boom from said mast comprising a plurality of sections having adjustable range and angle cooperation therebetween, a tool carrier mounted on the boom, means for adjusting the tool carrier as to the mast and the vehicle, and a power transmission from the vehicle to the carrier for rotating the carrier.

4. A vehicle, a mast thereon, a boom from said mast comprising a plurality of sections having adjustable range and angle cooperation therebetween, a tool carrier mounted on the boom and adjustable angularly as to the vehicle and mast, and a power transmission from the vehicle to the carrier for rotating the carrier.

5. A vehicle, a mast thereon, a boom from said mast comprising a plurality of sections having adjustable range and angle cooperation therebetween, a tool carrier mounted on the boom and adjustable angularly on said mounting and radially as to the mast, and a power transmission from the vehicle to the carrier for rotating the carrier.

6. A vehicle, a mast thereon, a boom from said mast comprising a plurality of sections having adjustable range and angle cooperation therebetween, a tool carrier mounted on the boom and adjustable angularly as to the mast, and a power transmission from the vehicle to the carrier for rotating the carrier.

7. A vehicle, a mast thereon, a boom from said mast comprising a plurality of sections having adjustable range and angle cooperation therebetween, a rotary tool carrier having a telescopic mounting connection terminally of the boom, means for horizontally swinging the boom on said mounting as to the mast, and a power transmission on the vehicle to the carrier for rotating the carrier.

In witness whereof I affix my signature.

LOUIS I. BROWNE.